United States Patent [19]

Hiromoto et al.

[11] Patent Number: 5,200,744
[45] Date of Patent: Apr. 6, 1993

[54] INTERACTIVE PLANT MONITORING SYSTEM

[75] Inventors: Hiroshi Hiromoto, Kokubunji; Hideo Ohashi, both of Fuchu, Japan

[73] Assignee: Kabushiki Kaisha Toshiba, Kawasaki, Japan

[21] Appl. No.: 472,961

[22] Filed: Jan. 31, 1990

[30] Foreign Application Priority Data

Jan. 31, 1989 [JP] Japan .................................. 1-19727

[51] Int. Cl.⁵ .............................................. H04Q 9/00
[52] U.S. Cl. ......................... 340/825.15; 340/825.17; 340/706
[58] Field of Search ...................... 340/825.06, 825.15, 340/825.17, 706, 754, 712, 721; 364/146, 188, 468

[56] References Cited

U.S. PATENT DOCUMENTS

| | | | |
|---|---|---|---|
| 3,444,521 | 5/1969 | Breese | 340/825.15 |
| 3,958,240 | 5/1976 | Richardson, III | 340/825.17 |
| 4,396,977 | 8/1983 | Slater, et al. | 340/706 |
| 4,727,473 | 2/1988 | Anderson et al. | 364/188 |
| 4,805,089 | 2/1989 | Lane et al. | 364/188 |
| 4,815,014 | 5/1989 | Lipner et al. | 364/188 |

OTHER PUBLICATIONS

K. Niki et al., "Hardware System for Man-Machine Interface", Thermal and Atomic Power Generation, vol. 39 No. 10, Oct. 1988, pp. 51-62.
T. Mozai et al., "Integrated Digital Control System for Thermal Power Plant", Toshiba Review Sep. 1988, pp. 715-720.
H. Fukuda et al., "Integrated Control System of KAWAGOE Thermal Power Plant", EPRI Conference on Power Plant Controls and Automatic, held Feb. 7-9, 1989.

Primary Examiner—Donald J. Yusko
Assistant Examiner—Edwin C. Holloway, III
Attorney, Agent, or Firm—Foley & Lardner

[57] ABSTRACT

An interactive plant monitoring system in which a plurality of interactive functions for monitoring a plant are displayed on a CRT display in a predetermined order, and an input to the plurality of interactive functions is discriminated on the basis of an input signal from an interactive input device realizing an interactive function operation together with the CRT display. The interactive plant monitoring system includes a plant condition discriminating unit for discriminating the plant condition on the basis of the process data output from the plant; a memory for storing the information regarding an interactive function display order which is previously determined for each plant condition; and an interactive function order controller for picking up the interactive function display order information from the memory in accordance with the discrimination result by the plant condition discriminating unit and displaying the information on a monitoring screen.

3 Claims, 15 Drawing Sheets

| REFERENCE INTERACTIVE FUNCTION | INTERACTIVE FUNCTIONS RELATED TO REFERENCE INTERACTIVE FUNCTION | | | |
|---|---|---|---|---|
| $a_1$ | $a_3$ | $a_7$ | ........ | $a_{10}$ |
| $a_2$ | $a_4$ | $a_{15}$ | ........ | |
| ⋮ | ⋮ | ⋮ | ⋮ | ⋮ |
| $a_m$ | $a_1$ | $a_{n-1}$ | ....... | $a_{m-1}$ |

FIG. 15

INTERACTIVE PLANT MONITORING SYSTEM

BACKGROUND OF THE INVENTION

The present invention relates to an interactive plant monitoring system for interactively monitoring at a plant.

In a plant monitoring control system using a computer, various interactive functions are generally provided for the purpose of supplying an operator with various process quantities.

For example, in a computer system for the control/monitoring of an electric power station, there are provided as many as one hundred interactive functions whose functions are realized by using interactive devices constructed of CRT displays, keyboards, screen pointers and the like.

One of the fundamental principles in operating an interactive device is to design it so as to allow access to desired data with as small number of operation procedures as possible.

It can thus be thought of that an operation key is provided for each of interactive functions so that each interactive function can be directly chosen upon operation of the corresponding key. However, it becomes necessary to provide a great number of operation keys, resulting in a bulky keyboard and in a difficulty of quickly finding a proper key.

In order to prevent interactive devices from swelling to a bulky size and being unable to find a proper function at once, it has been proposed recently to display interactive function operation key symbols on the lower portion of the screen of a CRT display and select a key symbol proper to the desired interactive function by using a screen pointer.

In the above case, there is also proposed to display a screen image dedicated to the interactive operation only for the purpose of efficiently selecting a desired function.

Further, since all operation functions cannot be displayed on a single screen at a time, the operation functions are time divisionally displayed on the screen. In this case, the operation functions most frequently used in the past are allocated to be displayed on the screen, so that a proper function can be selected with a fewer number of operation procedures by an operator.

Such a display allocation of operation functions in a conventional system has been fixedly set at the time of system design, thus posing the following problems.

Namely, since the operation functions necessary for the monitor of a plant change with the plant condition and its operation state, there occur cases that take a long time to find a proper function.

For example, the operation function items for a thermal power generating plant change in accordance with the plant conditions (1) during start/stop operation, (2) at normal running, (3) during plant stoppage, and (4) upon occurrence of an urgent trouble.

During start/stop operation, an operator is busiest, so there is often used a function of displaying a plant system diagram and a trend graph indicative of the time sequence of state quantities.

During normal running, the plant is stable so that the number of interactive operation requests is relatively small. Also, during this normal running, the frequency of using the functions relating to plant performance management becomes high.

During plant stoppage, although monitoring for the plant is less, the frequency of using the test functions for maintenance becomes high.

Upon occurrence of an urgent trouble of the plant, similar to the start/stop operation, the functions of displaying the plant system diagram and trend graph are much used. In addition, the frequency of using the interactive function for dealing with trouble becomes very large.

As described above, the interactive function to be used changes greatly in accordance with the plant operation conditions. With a conventional system, therefore, in some cases, a number of operation steps are required in order to select a proper interactive function.

SUMMARY OF THE INVENTION

It is therefore an object of the present invention to solve the above problems associated with a conventional system, and to provide an efficient interactive plant monitoring system.

The system of this invention provides means for controlling the order of interactive functions to be displayed on the plant monitoring screen, in accordance with the plant conditions or the use frequency of interactive function.

Specifically, the interactive plant monitoring system of this invention comprises plant condition discriminating means for discriminating the plant condition on the basis of the process data outputted from the plant; memory means for storing the information regarding an interactive function display order which is previously determined for each plant condition; and interactive function order controlling means for picking up the interactive function display order information from the memory means in accordance with the discrimination result by the plant condition discriminating means and displaying the information on a monitoring screen.

The system of this invention may provide operation request number counting means for counting the operation frequency.

The system of this invention may also provide means for displaying an interactive function to be operated next at higher possibility, in accordance with the operation transfer information which indicate the relationship between two interactive functions.

According to the present invention, the order of interactive functions to be displayed on the plant monitoring screen is controlled in accordance with the plant conditions or the use frequency of interactive functions, thus allowing to the interactive functions in accordance with the plant monitoring conditions and monitoring operation conditions to be most efficiently displayed. Accordingly, the burden on an operator for finding a proper interactive function can be reduced considerably, resulting in efficient plant monitoring.

BRIEF DESCRIPTION OF THE DRAWINGS

In the accompanying drawings,

FIG. 15 is a diagram showing operation transition information.

DESCRIPTION OF THE PREFERRED EMBODIMENTS

Figure 1:
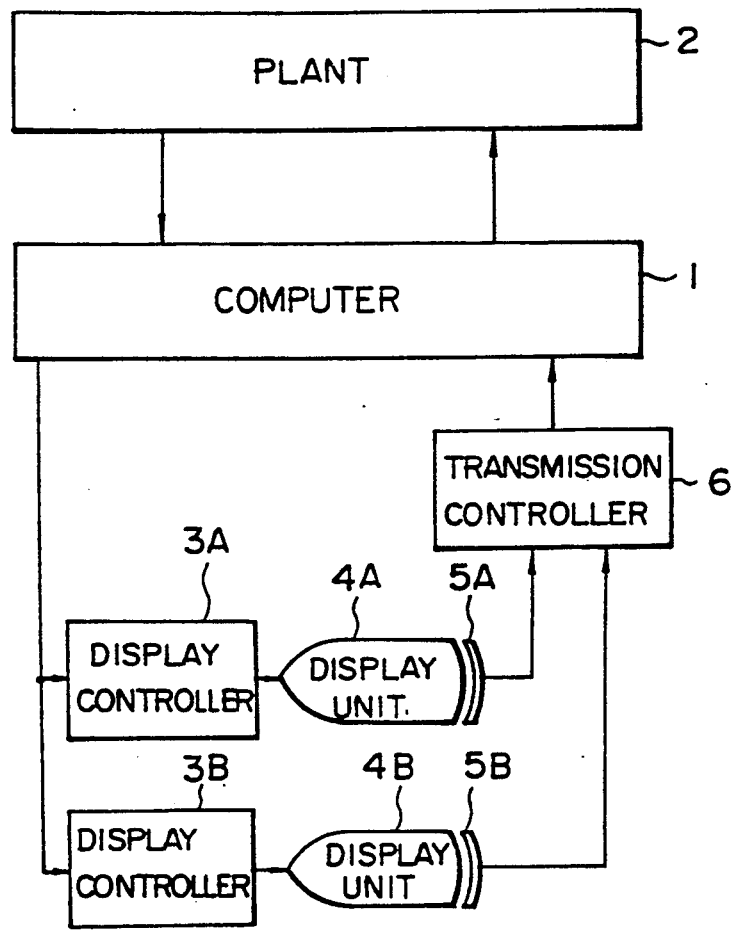
FIG. 1 is a block diagram showing the outline of a plant monitoring system according to an embodiment of this invention.

FIG. 1 shows the outline of a plant monitoring system according to an embodiment of this invention.

A computer 1 performing control processes for the plant monitoring system receives process signals from a plant 2 at their proper timings, and outputs monitor images to a display controller 3A, 3B for monitoring the plant 2.

The display controller 3A, 3B controls to display monitor images on a display unit 4A, 4B, such as CRT display unit, in accordance with the display data inputted from computer 1.

The display unit 4A, 4B is equipped with an interactive function operation device 5A, 5B, such as a touch screen, the device 5A, 5B being used for designating an operation element displayed on the monitoring screen. The designation signal outputted from the interactive operation device 5A, 5B is supplied to the computer 1 via a transmission controller 6.

As described above, the plant monitoring system has two interactive monitoring apparatuses respectively constructed of the display unit 4A and interactive function operation device 5A, and of the display unit 4B and interactive function operation device 5B. The two interactive monitoring apparatuses monitor the plant 2 independently from each other.

Figure 2:
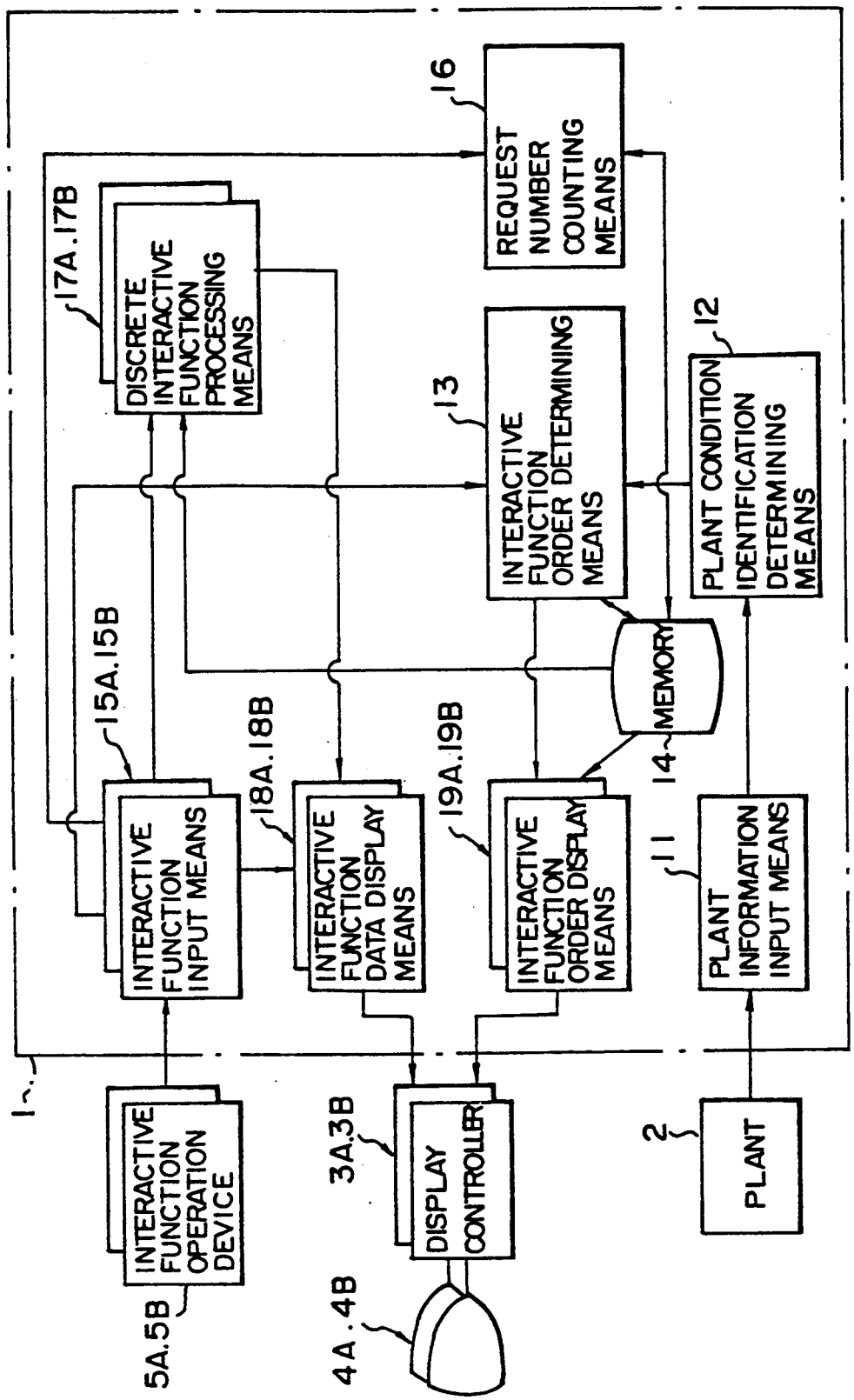
FIG. 2 is a functional block diagram of software showing the plant monitoring system according to an embodiment of this invention.

FIG. 2 shows an example of the structure of the computer 1.

Plant information input means 11 receives process signals outputted from the plant 2 at their proper timings, and outputs them to plant condition identification determining means 12.

In accordance with the process signal inputted from the plant information input means 11, the plant condition identification determining means 12 determines a plant condition identification indicative of the running condition of the plant 2. The determined plant condition identification number information is supplied to the interactive function order determining means 13.

The plant condition identification includes, for example, "during plant start/stop operation", "during normal plant running", "during plant stoppage", "upon occurrence of an urgent trouble" and so on.

Stored in the memory 14 are the request number count table storing the frequency of use and operation transition state of each interactive function (operation function) executed by the computer 1 during the plant monitoring, the precedingly selected interactive function number indicative of the precedingly selected interactive function, the present plant condition identification value indicative of the present plant condition identification, the interactive function priority order information indicative of the priority order of an interactive function displayed on the monitoring screen, the interactive function relationship order information indicative of a plurality of interactive functions to be displayed next at higher possibility, and other information.

Request number count table and interactive function priority order information are provided for each plant condition identification. The interactive function priority order information has an initial value for each plant condition identification.

The interactive function relationship order information includes both initial fixed information, and variable information which varies in the system of this invention. The fixed information is determined empirically in most cases, whereas the variable information is determined by the above-described interactive function order determining means 13.

If the two interactive monitoring apparatuses provided for the computer 1 can freely use all of the monitor screens, they can commonly access various information stored in the memory 14 for performing an interactive monitoring process. If the monitor screens are restricted in use by the two interactive monitoring apparatus, each apparatus independently stores its own information in the memory 14, the information including the request number count table, precedingly selected interactive function number, interactive function priority order information, interactive function relationship order information and the like.

The operation transition information is the information indicating a master/slave relationship between interactive functions.

In general, during the interactive operation, there is a case where upon selection of one interactive function, another interactive function which has an intimate relation thereto is likely to be selected next. The operation transfer information indicative of such master/slave relationship is tabulated as shown in FIG. 15. In the table of FIG. 15, reference interactive functions include all the interactive functions selectable in the system, whereas related interactive functions are those functions having a high possibility of being selected next the reference interactive function.

For example, if an interactive function a2 is assumed to be selected, then an interactive function a4 is selected thereafter by all means regardless of a low use frequency thereof in the whole system. In the table, therefore the interactive function a4 is related to the interactive function a2 so as to be selected easily.

In response to the designation signal inputted from the interactive function operation device 5A, 5B, interactive function input means 15A, 15B discriminates the operated interactive function, and outputs the discriminated information (interactive function number) to the interactive function order determining means 13 and request number counting means 16. The interactive function number is also supplied to discrete interactive function processing means 17A, 17B. The interactive function input means 15A, 15B outputs the information relating to a change in display screen with an inputted operation to interactive function data display means 18A, 18B.

In accordance with the interactive function number from the interactive function input means 15A, 15B and in accordance with the precedingly selected interactive function number and present plant condition identification value stored in a memory 14, request number counting means 16 updates the contents of a request number count table in the memory 14.

The discrete interactive function processing means 17A, 17B performs the interactive monitoring process independently for the interactive monitoring apparatus constructed of the display unit 4A and the interactive function operation device 5A and for the interactive monitoring apparatus constructed of the display unit 4B and interactive function operation device 5B. The interactive monitoring process is performed by picking up from the memory 14 the program for processing a requested interactive function and interactive function screen data, in accordance with the interactive function number inputted from the interactive function input means 15A, 15B. The discrete interactive function processing means 17A, 17B generates the information for displaying the process results and the requested interactive function screen data, and outputs it to interactive function data display means 18A, 18B.

The interactive function data display means 18A, 18B generates display data corresponding to the display information inputted from the discrete interactive function processing means 17A, 17B, and outputs the display data to the display controllers 3A, 3B. It also changes the contents of the display data in accordance with the screen change information inputted from the interactive function input means 15A, 15B.

In accordance with the plant condition identification number information from the plant condition identification determining means 12 and in accordance with the interactive function number from the interactive function input means 15A, 15B, the interactive function order determining means 13 picks up the number information from the request number count table in the memory 14, and in accordance with this number information, updates the interactive function priority order information and interactive function relationship order information respectively stored in the memory 14. It also notifies the interactive function order display means 19A, 19B of a change in plant condition identification.

In accordance with the interactive function priority order information stored in the memory 14, the interactive function order display means 19A, 19B generates the display information by determining the order of interactive functions to be displayed on an interactive function area (to be described later) and interactive function selection screen of the first screen, and the display information for the interactive function selection screens of the second and the following screens, both the generated display information being outputted to the display controller 3A, 3B.

Figure 3:
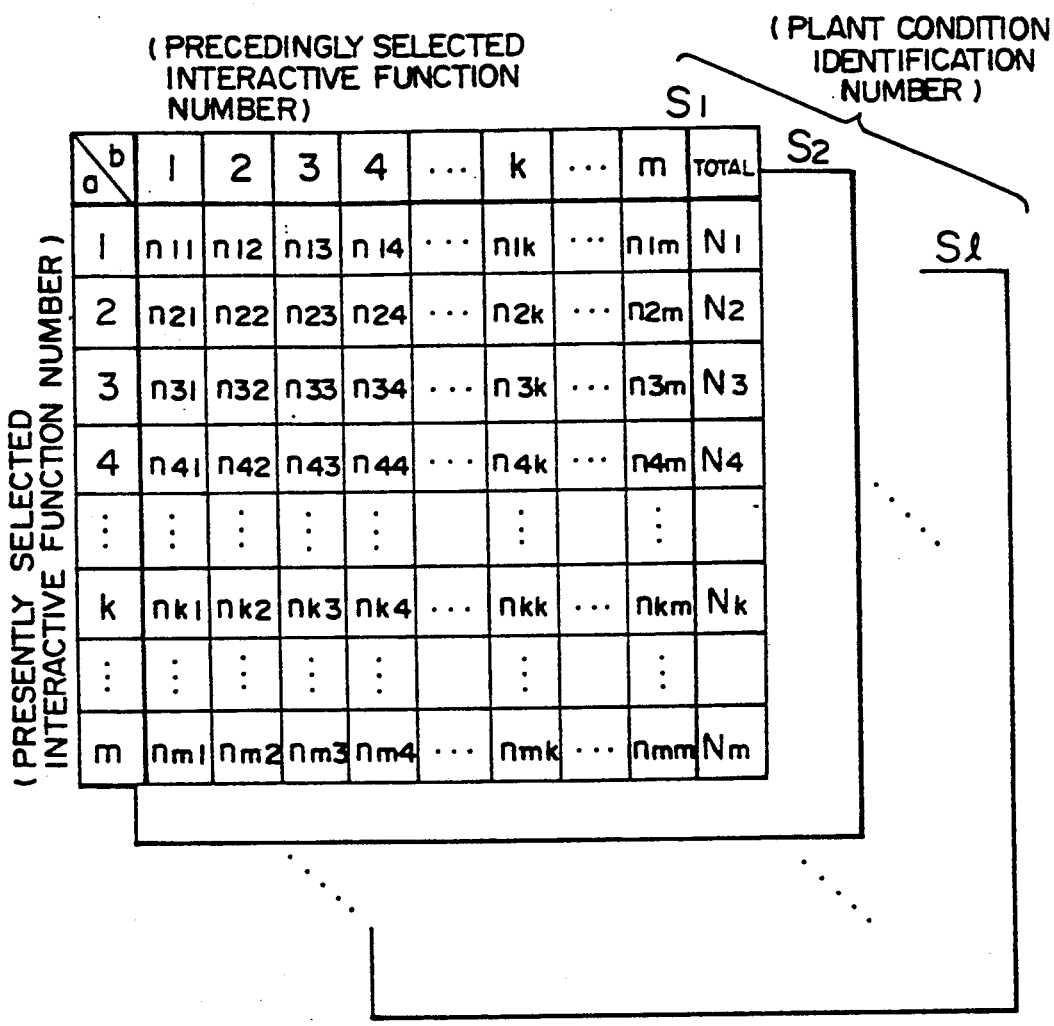
FIG. 3 shows an example of the outline of a request number count table.

FIG. 3 shows an example of the request number count table stored in the memory 14.

In this request number count table, the presently selected interactive function number and precedingly selected interactive function number b are entered, respectively, in the ordinate and abscissa axes for all the selectable interactive functions. At an intersection of each of the interactive function numbers and b, there is provided the number $n_{ab}$ of operations of the interactive function number after the interactive function number b was selected. The total operation numbers Nl to Nm are each the total number of selection operations of the interactive function number a.

Each request number count table is added with a corresponding plant condition identification number Sl to Sl.

Figures 4A, 4B, 4C:
FIGS. 4A and 4B show examples of the outline of interactive function priority order.
FIG. 4C shows an example of the outline of interactive function relationship order.

FIGS. 4A and 4B show examples of the interactive function priority order stored in the memory 14.

In the interactive function priority order, interactive function numbers are disposed in the priority order of each interactive function. The interactive function priority order is provided for each plant condition identification and has an initial value for each plant condition identification.

Figure 5:
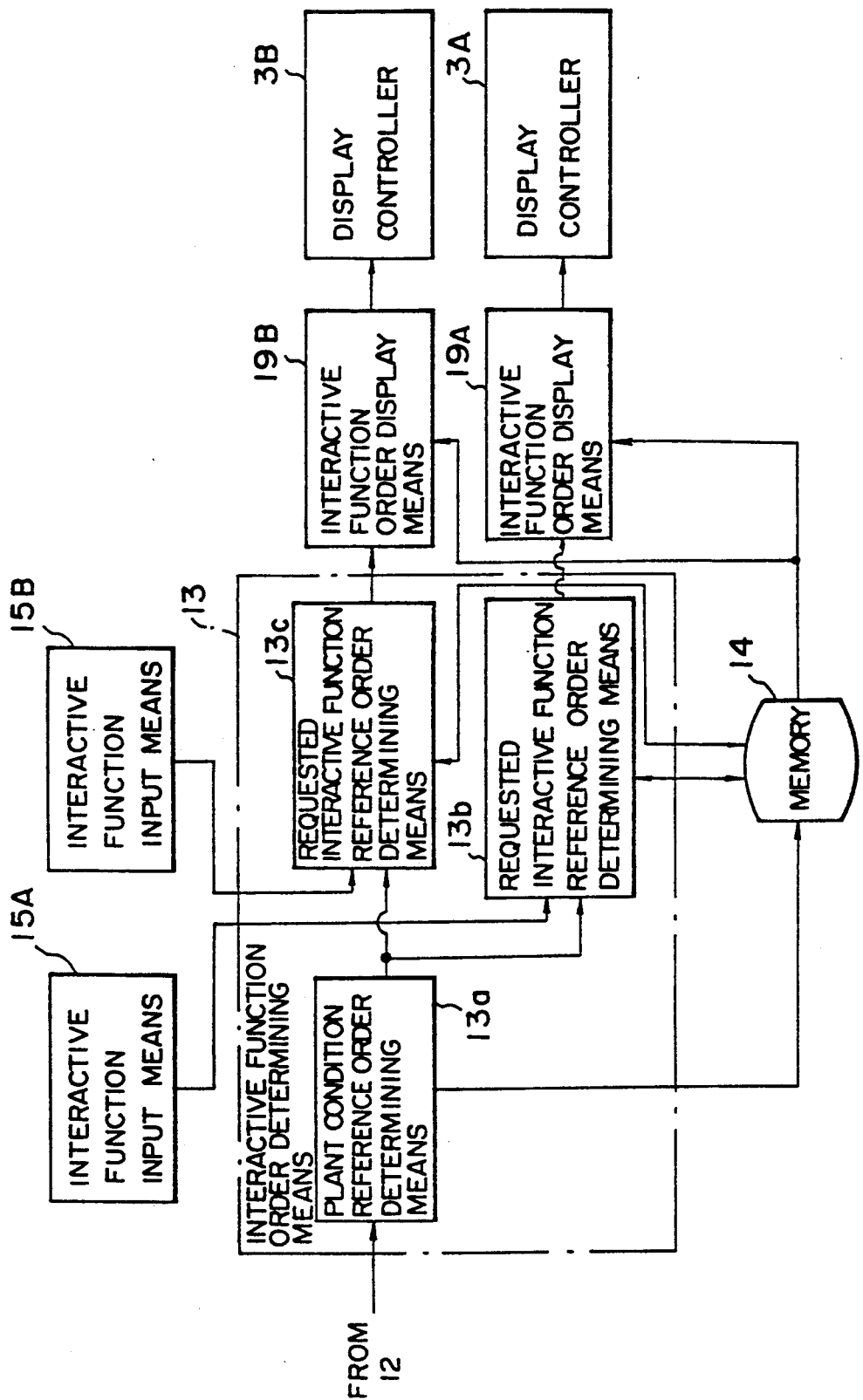
FIG. 5 is a functional block diagram showing an example of interactive function order determining means.

FIG. 5 shows an example of the interactive function order determining means 13.

The interactive function order determining means 13 is constructed of a plant condition reference order determining means 13a and requested interactive function reference order determining means 13b, 13c. The plant condition reference order determining means 13a updates the interactive function priority order when the plant condition identification changes. The requested interactive reference order determining means 13b, 13c updates the interactive function order for each interactive function operation device when the interactive function number is supplied from the interactive function input means 15A, 15B.

Figure 6:
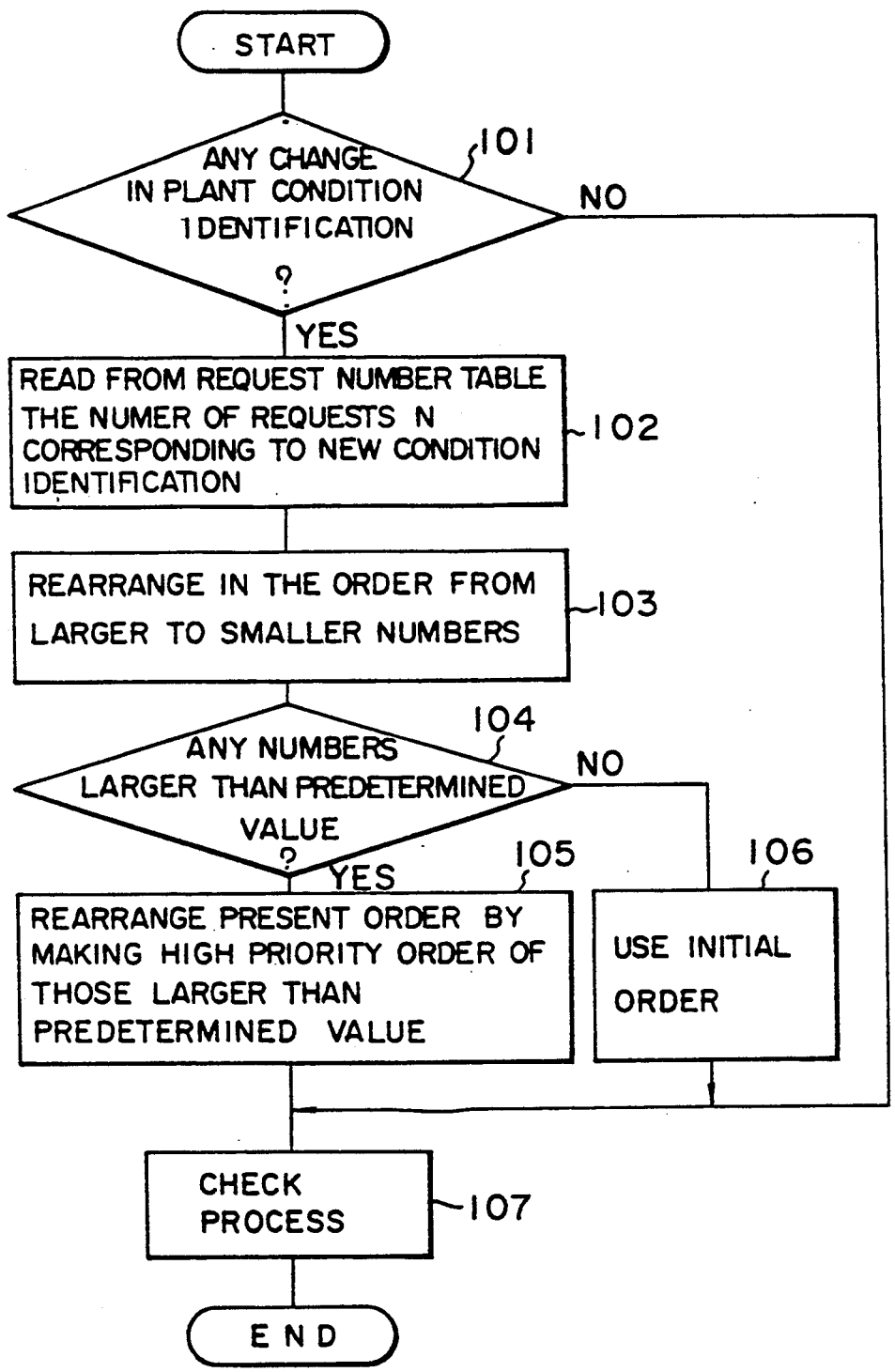
FIG. 6 is a flow chart showing an example of the operation by plant condition basic order determining means.

FIG. 6 shows an example of the processing by the plant condition reference order determining means 13a.

The plant condition reference order determining means 13 first compares the plant condition identification number inputted from the plant condition identification determining means 12 with the plant condition identification number information stored in the memory 14, to thereby check if there is any change in plant condition identification (judgement 101).

If the judgement 101 result is YES, the contents of the memory 14 are updated in accordance with the new plant condition identification number, and the request number count table corresponding to the new plant condition identification number is picked up from the memory 14 to read therefrom the total operation numbers Nl to Nm for each interactive function number (step 102).

The total operation numbers Nl to Nm are rearranged in the order from larger to smaller number (ste 103) to then check if there is any total operation number larger than the predetermined one (judgement 104).

If the judgement 104 result is YES, the interactive function priority order corresponding to the plant condition identification number is picked up from the memory 14. From the interactive priority order, the interactive function numbers corresponding to the total operation numbers Nl to Nm determined YES at judgement 104 are picked up. The corresponding picked-up total operation numbers Nl to Nm are rearranged in the order from larger number to smaller number. This rearranged order is added to the top of the interactive function priority order to thereby update the interactive function priority order corresponding to the plant condition identification number at that time (step 105).

Specifically, if only the total operation numbers N2, N7 and Nk for the interactive function numbers a2, a7 and ak are larger than the predetermined one in this order in the interactive function priority order shown in FIG. 4A, then, the interactive function priority order is rearranged as shown in FIG. 4B.

If the judgement 104 result is NO, the initial values for the interactive function priority order corresponding to the plant condition identification number are picked up from the memory 14, and the picked-up initial interactive function priority order is used (step 106).

After completion of process 105 or 106, there is executed a check process (step 107) for establishing the updated contents of the interactive function priority order. At this process 107, the updated contents are established if more than 1000 interactive function requests are present after the preceding updating or if a new month enters. If these conditions are not satisfied, the interactive function priority order is not allowed to be updated.

The reason for this is as follows. In general, an operator searches a desired interactive function or the like on the basis of the function names until the operator becomes accustomed with it. Once the operator becomes accustomed, he memorizes the display order of functions as a pattern so that if the function order is frequently changed, operability will be lowered.

Figure 7:
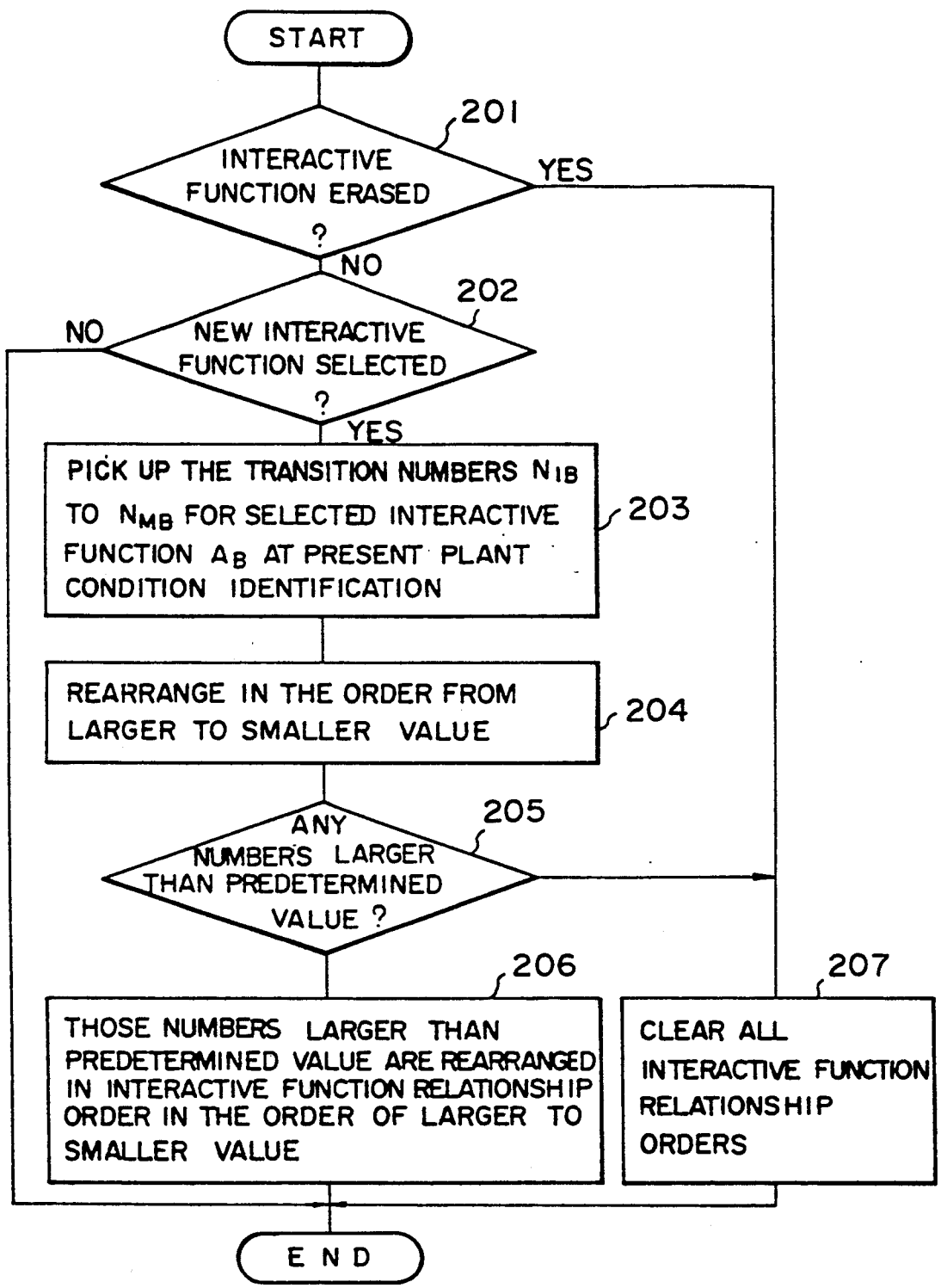
FIG. 7 is a flow chart showing an example of the operation by requested interactive function basic order determining means.

FIG. 7 shows an example of the processing by the requested interactive function reference order determining means 13b, 13c.

The requested interactive function reference order determining means 13b, 13c first checks if the interactive function being executed by the interactive function input means 15A, 15B has been completed and erased (judgement 201).

If the judgement 201 result is NO, it is checked if the interactive function has been changed and a new one has been selected (judgement 202).

If the judgement 202 result is YES, all the elements $n_{lb}$ to $n_{mb}$ at the column of the precedingly selected interactive function number b same as the presently requested interactive function number, are picked up from the request number count table corresponding to the plant condition identification at that time (step 203). The picked-up elements $n_{1b}$ to $n_{mb}$ are rearranged in the order from larger to smaller numbers (step 204).

A check is made for judging if there are any numbers among the picked-up numbers which are larger than a predetermined one (judgement 205). If the judgement 205 result is YES, the elements $n_{lb}$ to $n_{mb}$ larger than the predetermined one are rearranged in the interactive function relationship order in descending order from larger to smaller numbers (step 206).

With the above operations, there is formed an interactive function relationship order having as its element the interactive function numbers a4 and a5 for example as shown in FIG. 4C.

If the judgement 201 result is YES, it means that the interactive function has been executed completely. If the judgement 205 result is NO, it means that there is no interactive function presently requested. Consequently, there occurs a state that the order cannot be determined in accordance with the requested interactive function reference, so that all of the interactive function reference orders determined by the means 13 are cleared (step 207).

Figure 8:
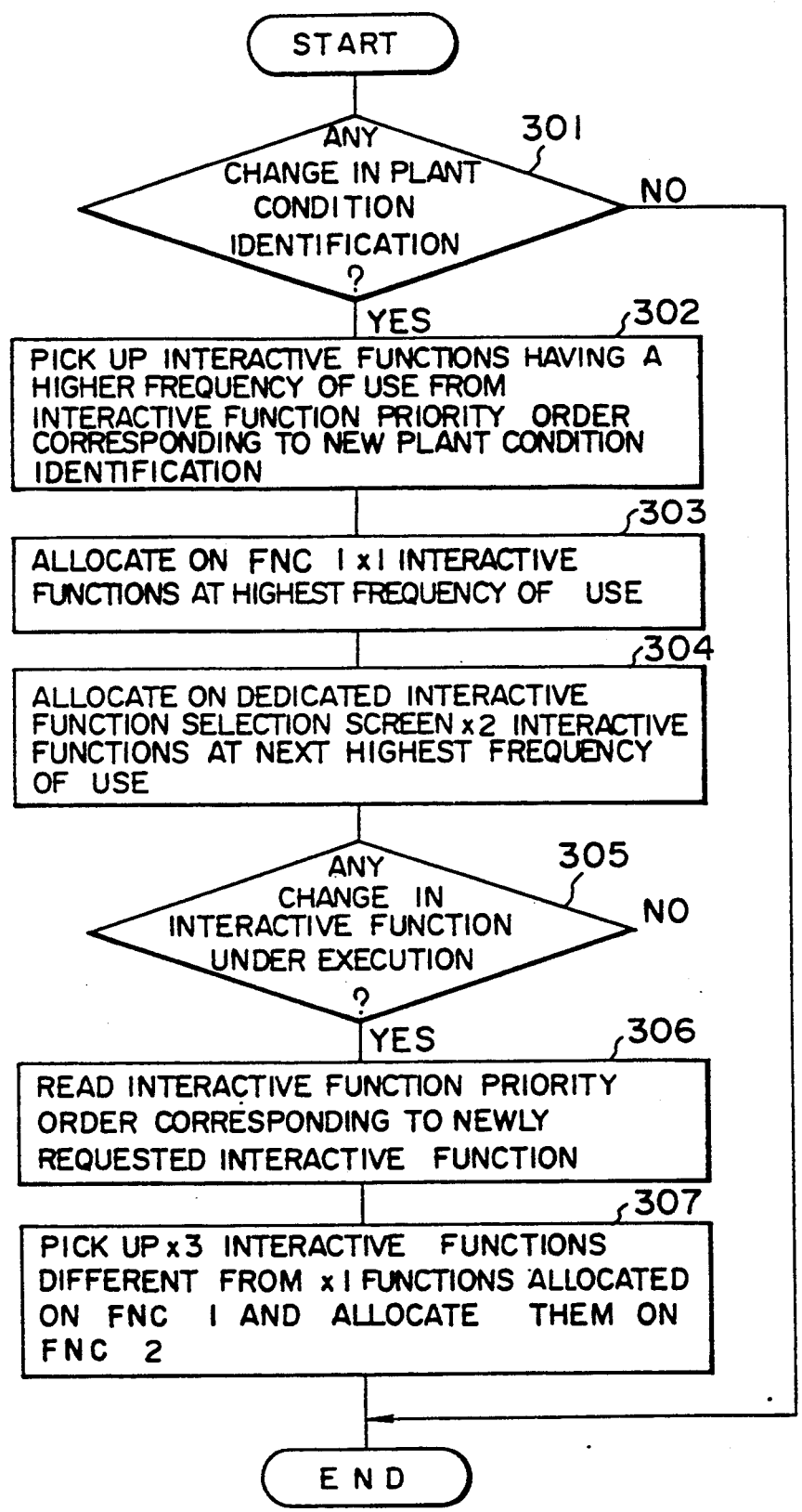
FIG. 8 is a flow chart showing an example of the operation by interactive function order displaying means.

FIG. 8 shows an example of the processing by the interactive function order display means 19A, 19B.

The interactive function order display means 19A, 19B first checks if the plant condition identification has changed (judgement 301).

If the judgement 301 result is YES, there is picked up from the memory 14 the interactive function priority order corresponding to the new plant condition identification (step 302).

Figure 9A:
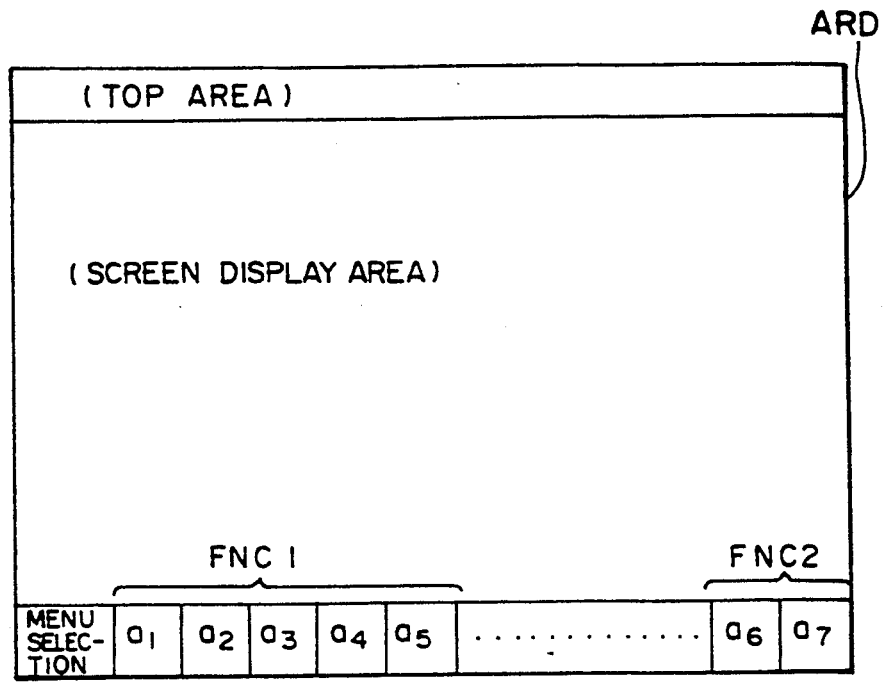
FIG. 9A shows an example of a display of an interactive function area on an interactive screen.
Figure 9B:
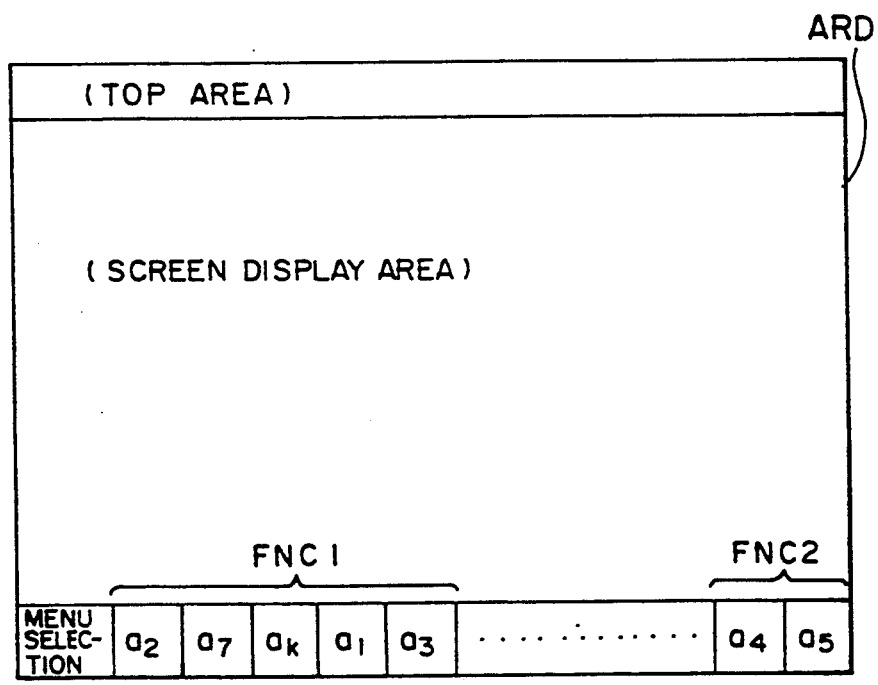
FIG. 9B shows another example of a display of an interactive function area on an interactive screen.

Thereafter, as shown in FIGS. 9A and 9B, there are allocated on the interactive function display area under the screen display area ARD of the display unit 4A, 4B, the interactive function contents corresponding to the first xl interactive function numbers of the interactive function priority order picked up at step 302. The interactive function display area has xl sections in the interactive function area FNC 1, which is always displayed irrespective of the display contents on the screen display area ARD (step 303). In accordance with the allocated interactive function contents, the display information to be outputted to the display controller 3A, 3B is rewritten. Also in this case, the contents of a conversion table to be used by the interactive function input means 15A, 15B for the discrimination of an interactive function, are rewritten in accordance with the results at the step 303.

Figure 10:
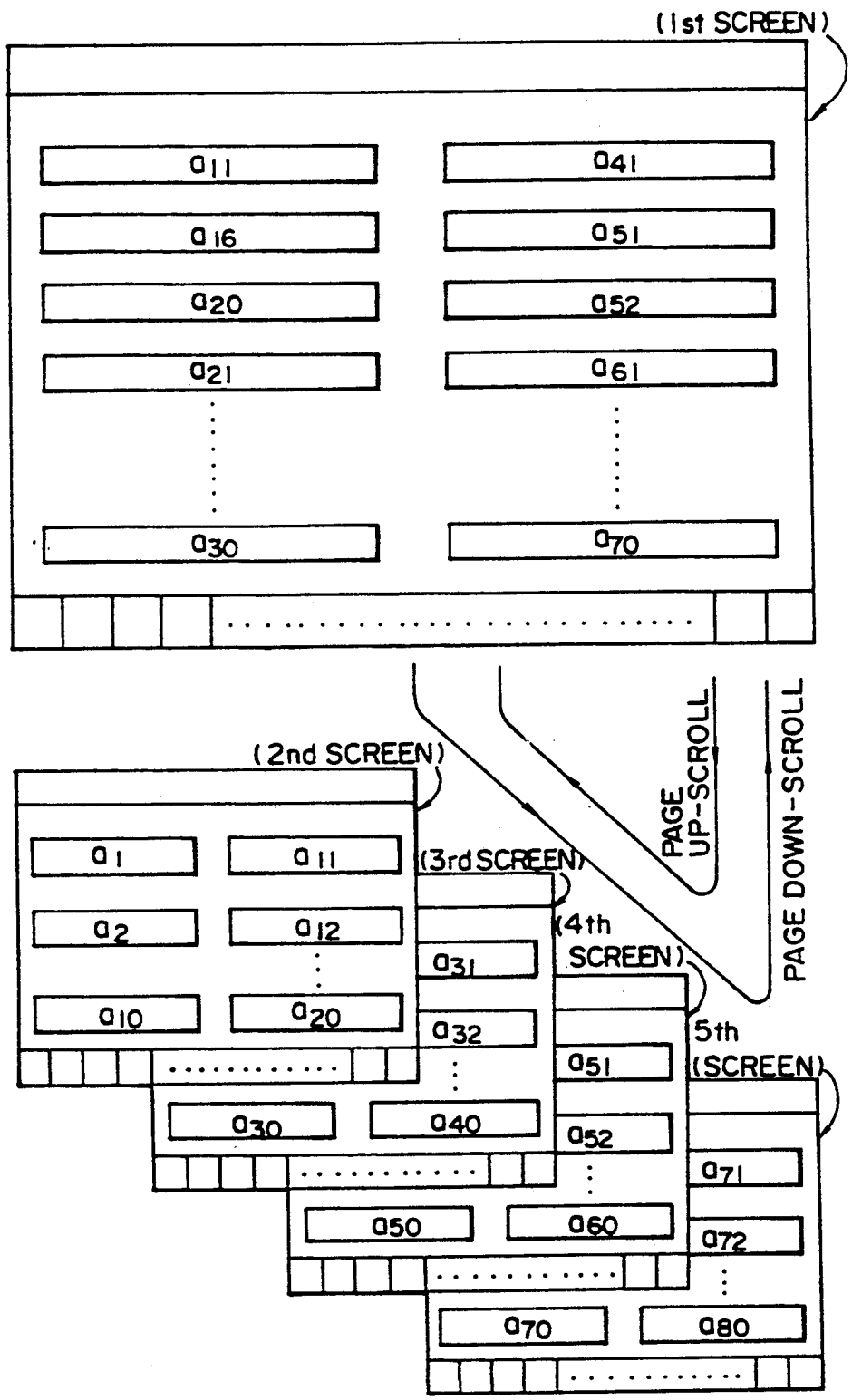
FIG. 10 shows an example of the outline of a dedicated interactive function selection screen.

Next, there are allocated on the first screen of a dedicated interactive function selection screen, shown by way of example in FIG. 10, the interactive function display contents corresponding to the first x2 interactive function numbers of the remaining numbers of the interactive function priority order picked up at the step 303 (step 304). Similar to the above case, the contents of the conversion table for the interactive function input means 15A, 15B are rewritten in accordance with the results at the step 304.

It is checked if the requested interactive function has been changed (judgement 305). If the judgement 305 result is YES, the interactive function relationship order is picked up from the memory 14 (step 306). Then, there are picked up the x3 interactive function numbers as the interactive function display contents to be allocated on an interactive function area FNC 2 (refer to FIG. 9A) adjacent to the interactive function area FNC 1 and under the screen display area ARD (step 307). In this step 307, there are not selected as the elements on the interactive function area FNC 2 are those interactive function numbers which are the same as those picked up at the step 303 and displayed on the interactive function area FNC 1. Also in this case, similar to the above case, the contents of the conversion table for the interactive function input means 15A, 15B are rewritten in accordance with the results at the step 307.

The numbers xl, x2 and x3 are determined for each system in accordance with the total number of interactive functions and the screen layout of each system.

Therefore, if the interactive function priority order and interactive function relationship are constructed as shown in FIGS. 4B and 4C, the contents of the interactive function numbers a2, a7, ak, al and a3 are sequentially allocated on the interactive function area FNC 1, and the contents of the interactive function numbers a4 and a5 on the interactive function area FNC 2, as respectively shown in FIG. 9B.

The interactive function selection screen is used basically for displaying all interactive functions of a system and selecting a proper one. As shown in FIG. 10, by way of example, as described previously, there are allocated on the first screen those interactive functions having a priority order next higher than those allocated on the interactive function area FNC 1 at the plant condition identification at that time. There are fixedly allocated on the second and following screens the display contents previously set for the system and stored in the memory 14. The switching between these screens can be carried out as desired by operating a page-up or -down scroll key.

With the above arrangement, the screen contents on the interactive function screen which the operator has memorized can be prevented from being unnecessarily changed, to thereby allow a proper interactive function to be reliably found.

On the other hand, those interactive functions having a higher use frequency at a particular plant condition identification can be displayed on the interactive function area FUNC 1 and first screen, so that a particular interactive function can be quickly found.

With the above arrangement, during plant running, there are displayed on the display unit 4A, 4B the plant monitoring data selected by an operator with the interactive function operation device 5A, 5B, on the interactive function area FNC 1 under the plant monitoring screen the contents of the interactive functions selected from the interactive function priority order with the interactive function display means 19A, 19B, and on the interactive function area FNC 2 the contents of the interactive functions selected from the interactive function relationship order.

If an interactive function request is made during the plant running, the request number counting means 16 increments the element value determined by the requested interactive function and the precedingly selected interactive function number stored in the memory 14, among the elements in the request number count table for the plant condition identification at that time. At the same time, the precedingly selected interactive function number in the memory 14 is updated.

In accordance with the interactive function, the interactive function order determining means 13 selects interactive functions having a higher possibility of being selected next from the request number count table for the plant condition identification at that time. The selected interactive functions are rearranged in the interactive function relationship order in the order of larger use frequency.

If the operation condition of the plant 2 changes and hence the plant condition identification changes, the interactive function order determining means 13 picks up the request number count table corresponding to the changed plant condition identification, and raises the priority order of interactive functions whose request numbers exceed the predetermined value to thereby update the interactive function priority order. In this case, if a sufficient time has elapsed after the preceding updating, the updated results are used and the contents of the memory 14 are rewritten.

If the running time becomes longer and the interactive functions to be used are changed to particular ones, the contents of the request number count table are sequentially updated in accordance with such change. As an appropriate time has elapsed, the interactive function priority order corresponding to each plant condition identification is sequentially rewritten starting from the initial values, and in accordance with the contents of the request number count table.

With such operations, the interactive functions displayed on the interactive function area FNC 1 by the interactive function order display means 19A, 19B change properly and in accordance with the running condition of the plant 2, to thereby always display the interactive functions having the highest use frequency.

The interactive functions displayed on the interactive function area FNC 2 by the interactive function order display means 19A, 19B also change properly and in accordance with the running condition of the plant 2, to display the interactive functions most likely to be used next. It is therefore expected that there is reduced the number of selections of the dedicated interactive function display screen for the selection of a proper interactive function.

In the above embodiment, the number of operation steps for the selection of a proper interactive function can be considerably reduced, to thereby improve plant monitoring efficiency.

Figure 11:
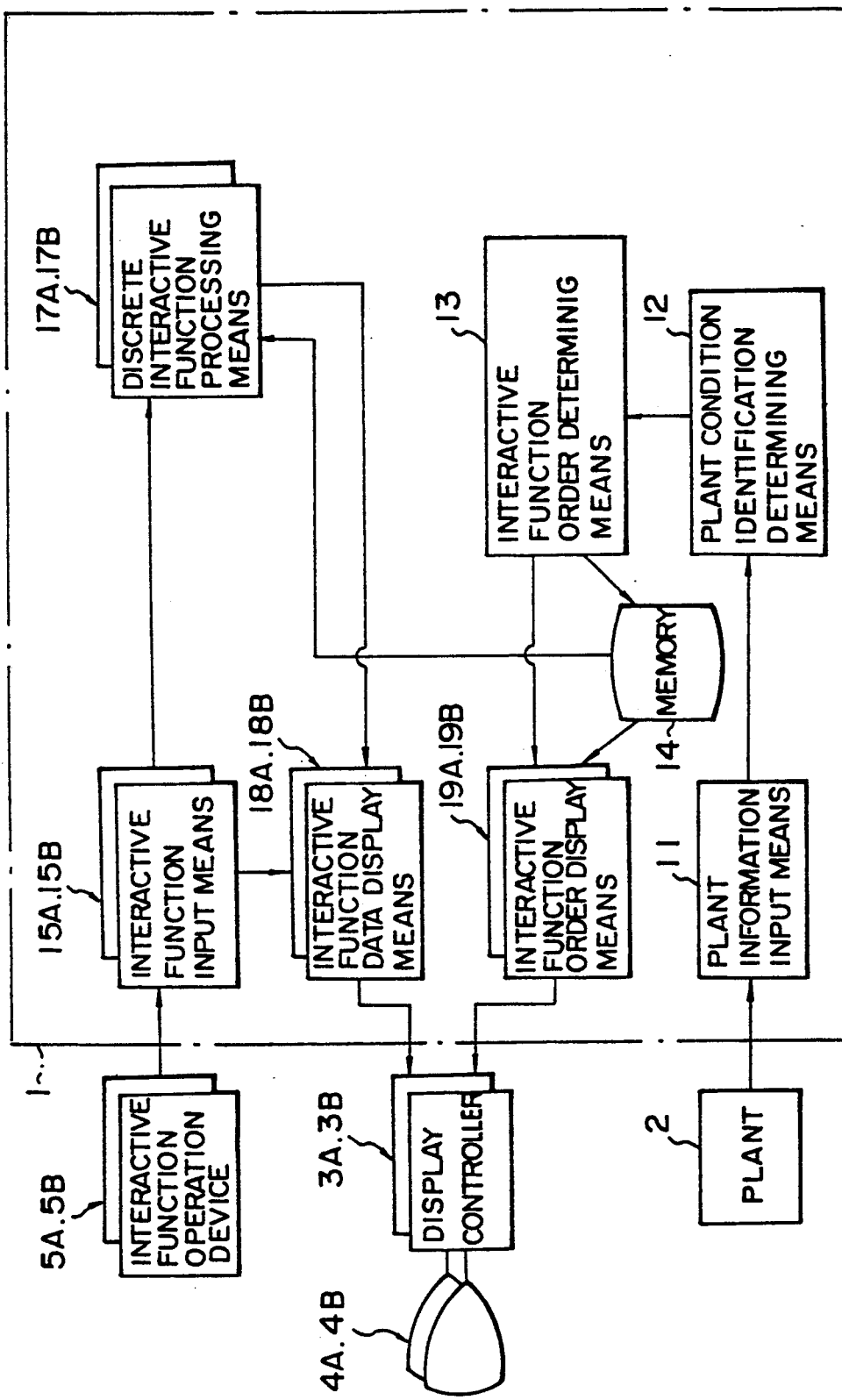
FIG. 11 is a functional block diagram showing a plant monitoring system according to another embodiment of this invention.

FIG. 11 shows the plant monitoring system according to another embodiment of this invention. In FIG. 11, similar or corresponding elements to those shown in FIG. 2 are represented by identical reference numerals.

In this embodiment, the request number counting means 16 of the first embodiment shown in FIG. 2 is omitted. This embodiment is, therefore, preferable for the case where the types of interactive functions are small in number, the number of operation steps required for obtaining a desired interactive function is very small, and there is less correlation between the selection orders for an interactive function.

In this embodiment, the interactive function order determining means 13 is constructed without the requested interactive function reference order determining means 13b, 13c shown in FIG. 5. The plant condition reference order determining means 13a does not rearrange the interactive function priority order. Since the memory 14 has not the interactive function relationship order, the interactive function order display means 19A, 19B does not perform display control regarding the interactive function area FNC 2.

Figure 12:
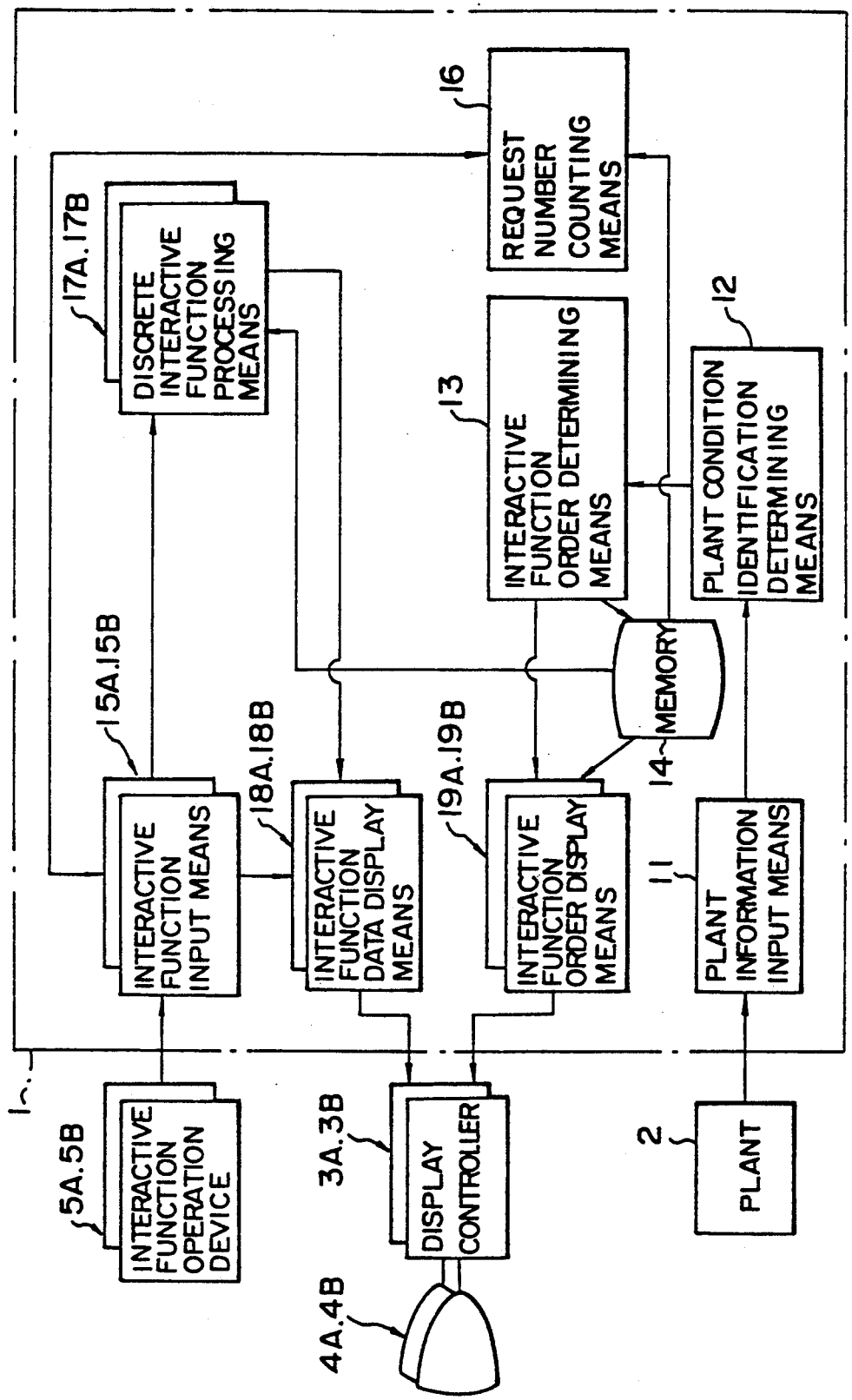
FIG. 12 is a functional block diagram showing a plant monitoring system according to a further embodiment of this invention.

FIG. 12 shows the plant monitoring system according to another embodiment of this invention. In FIG. 12, similar and corresponding elements to those shown in FIG. 2 are represented by identical reference numerals.

In this embodiment, the interactive function priority order is rearranged in accordance with the frequency of use of the interactive function, without generating the interactive function relationship order. Therefore, this embodiment is preferably applied to cases where there is less correlation between the selection orders of an interactive function.

In this embodiment, the interactive function order determining means 13 is constructed without the requested interactive function reference order determining means 13b, 13c shown in FIG. 5, so that the memory 14 has not the interactive function relationship order. The interactive function order display means 19A, 19B does not perform the display control regarding the interactive function area FNC 2.

Figure 13:
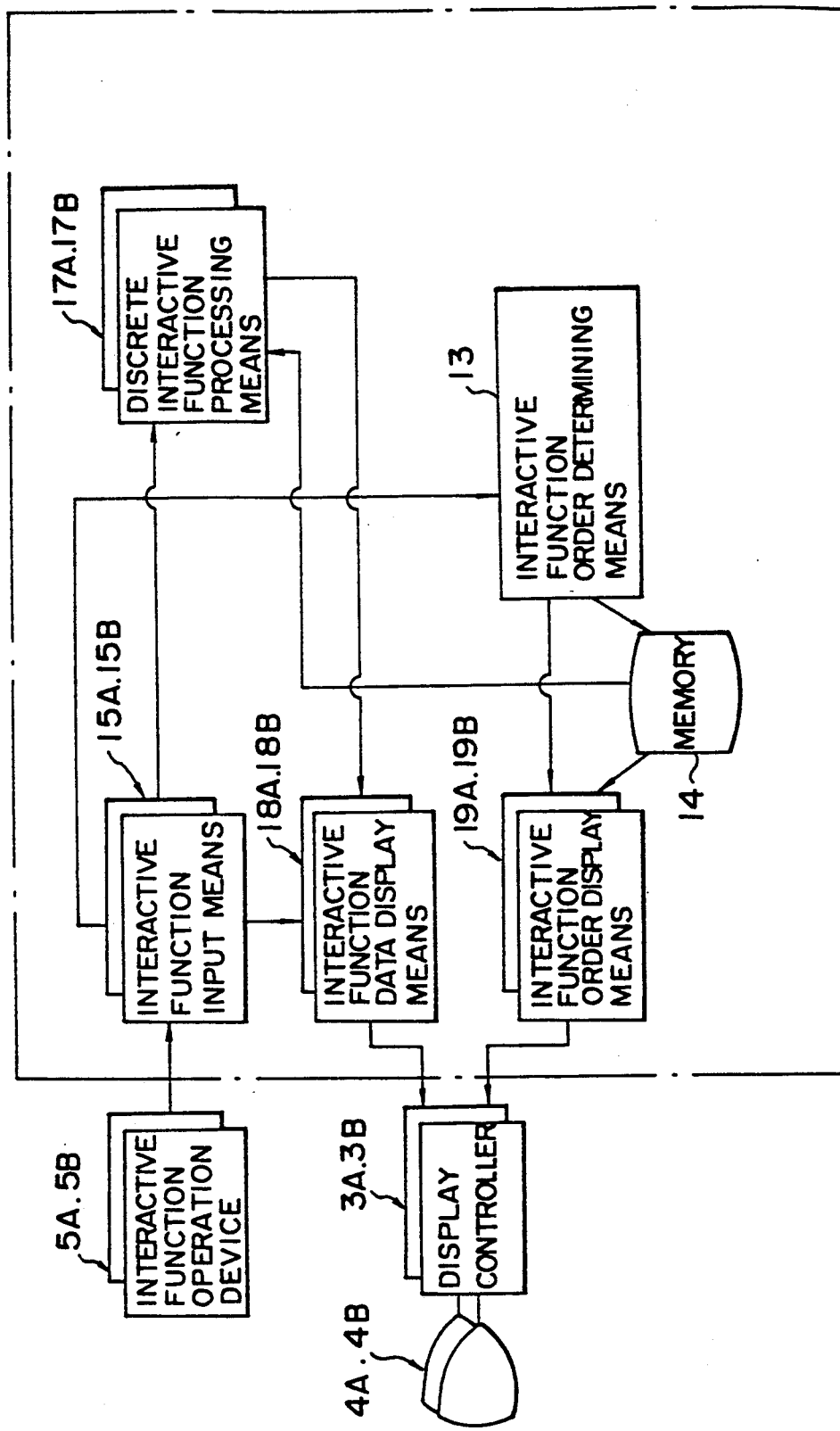
FIG. 13 is a functional block diagram showing a plant monitoring system according to a still further embodiment of this invention.

FIG. 13 shows the plant monitoring system according to a further embodiment of this invention. In FIG.

13, similar and corresponding elements to those shown in FIG. 2 are represented by identical reference numerals.

In this embodiment, the interactive function relationship order corresponding to the correlation between the selection orders of an interactive function is previously stored in the memory 14, the interactive function relationship order being fixedly used without updating.

In this case therefore, the interactive function order determining means 13 is constructed without the 30 plant condition reference order determining means 13a shown in FIG. 5, and selects the interactive functions to be displayed on the interactive function area FNC 2 in accordance with the interactive function supplied from the interactive function input means 15A, 15B, and outputs them to the interactive function order display means 19A, 19B.

Figure 14:
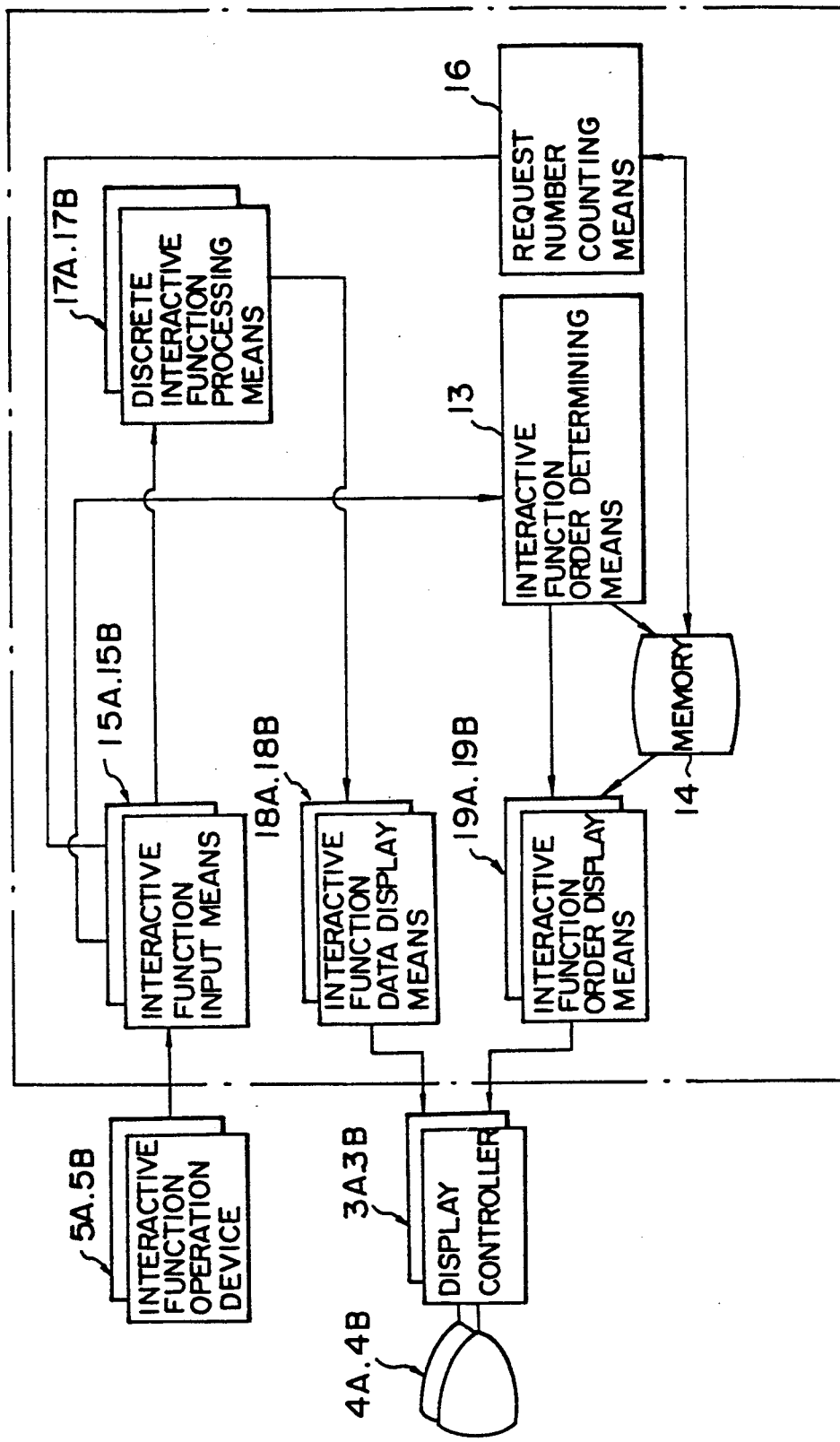
FIG. 14 is a functional block diagram showing a plant monitoring system according to another embodiment of this invention.

FIG. 14 shows the plant monitoring system according to a still further embodiment of this invention. In FIG. 14, similar and corresponding elements to those shown in FIG. 2 are represented by identical reference numerals.

In this embodiment, the interactive function relationship order corresponding to the correlation between the selection orders of an interactive function is previously stored in the memory 14, the interactive function relationship order being used by updating if necessary in accordance with the use frequency.

In this embodiment therefore, the interactive function order determining means 13 is constructed without the 30 plant condition reference order determining means 13a shown in FIG. 5. The request number count table in the memory 14 is a commonly used single table without discrimination between plant condition identifications.

Specifically, in accordance with the interactive function designated by the interactive function input means 15A, 15B, the request number count table is updated. The interactive function relationship order is updated if necessary, by the interactive function order determining means 13. The display contents on the interactive function area FNC 2 are thereby updated each time an interactive function is selected.

In the above-described embodiments, two interactive monitoring apparatuses have been used. The invention is also applicable to the system having one interactive monitoring apparatus or three or more interactive monitoring apparatus.

What is claimed is:

1. An interactive plant monitoring system wherein a plurality of interactive functions for monitoring a plant are displayed on a monitoring screen of a CRT display, and an input to each of the plurality of interactive functions is discriminated on the basis of an input signal from an interactive input device connected to the CRT display for realizing an interactive operation together with the monitoring screen, the interactive plant monitoring system comprising:

plant condition discriminating means for discriminating the plant operation condition on the basis of the process data outputted from the plant;

memory means for storing information regarding the display order of the interactive functions which are previously determined for each plant condition;

interactive function order controlling means for picking up information regarding display order of the interactive functions from said memory means in accordance with the discrimination result by said plant condition discriminating means and for displaying the information regarding display order on said monitoring screen;

operation request number counting means for accumulating the operation number of an interactive function displayed on the monitoring screen for each plant condition and storing said accumulated operation number; and interactive function order determining means for picking up from said memory means information regarding the display order of the interactive functions in accordance with the discrimination result by said plant condition discriminating means, setting an interactive function display priority order in accordance with the interactive function operation number picked up from said operation request number counting means in accordance with the discrimination result by said plant condition discriminating means, and updating said interactive function display order information in accordance with said display priority order;

whereby said interactive function order controlling means displays the interactive functions in accordance with the information determined by said interactive function order determining means.

2. An interactive plant monitoring system wherein a plurality of interactive functions for monitoring a plant are displayed on a monitoring screen of a CRT display, and an input to each of the plurality of interactive functions is discriminated on the basis of an input signal from an interactive input device connected to the CRT display realizing an interactive function operation together with the monitoring screen, the interactive plant monitoring system comprising:

plant condition discriminating means for discriminating the plant operation condition on the basis of the process data outputted from the plant;

memory means for storing information regarding the display order of interactive functions which is previously determined for each plant condition, and storing the operation transition information indicating the relationship between two interactive functions to be consecutively operated;

operation request number counting means for accumulating the operation number of an interactive function displayed on the monitoring screen for each plant condition, and storing said accumulated operation number;

interactive function order determining means for picking up from said memory means the information regarding the display order of interactive functions in accordance with the discrimination result by said plant condition discriminating means, for setting an interactive function display priority order in accordance with the interactive function operation number picked up from said operation request number counting means in accordance with the discrimination result by said plant condition discriminating means, and updating said information regarding display order of interactive functions in accordance with said display priority order; and interactive function order controlling means for displaying on said monitoring screen interactive functions in accordance with the information determined by said interactive function order determining means, and interactive functions having a higher possibility of being operated immediately after a preceding interactive function in accordance with said operation transition information.

3. An interactive plant monitoring system according to claim 2, further comprising updating means for updating said operation transition information in according with a combination of a presently operated interactive function and interactive functions operated immediately before.

* * * * *